No. 788,306. PATENTED APR. 25, 1905.
G. DEVOLL & G. H. RISLEY.
PNEUMATIC TIRE.
APPLICATION FILED JUNE 28, 1904.
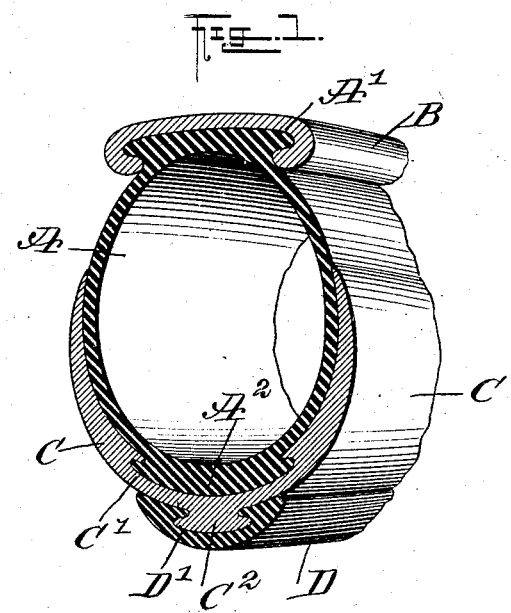
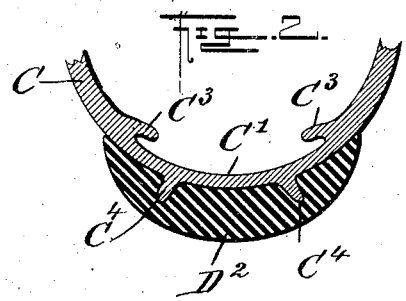
WITNESSES:
INVENTORS
George Devoll
George H. Risley
BY
ATTORNEYS No. 788,306. Patented April 25, 1905.

UNITED STATES PATENT OFFICE.

GEORGE DEVOLL, OF BOSTON, MASSACHUSETTS, AND GEORGE H. RISLEY, OF BRIELLE, NEW JERSEY.

PNEUMATIC TIRE.

SPECIFICATION forming part of Letters Patent No. 788,306, dated April 25, 1905.

Application filed June 28, 1904. Serial No. 214,431.

*To all whom it may concern:*

Be it known that we, GEORGE DEVOLL, of Boston, in the county of Suffolk and State of Massachusetts, and GEORGE H. RISLEY, of Brielle, in the county of Monmouth and State of New Jersey, citizens of the United States, have invented a new and Improved Pneumatic Tire, of which the following is a full, clear, and exact description.

The invention relates to pneumatic tires, such as are used on the wheels of vehicles; and its object is to provide a new and improved pneumatic tire arranged to prevent the rubber tube of the tire from being punctured and at the same time afford the desired elasticity.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a sectional perspective view of the improvement, and Fig. 2 is a cross-section of a modified form of the protector and the tread.

The rubber tube A of the tire is provided with an offset $A'$, engaged by the rim B of the wheel, so as to hold the rubber tube A in position on the rim. On the tube A is also formed integrally a tongue $A^2$, located diametrically opposite the offset $A'$ and formed on the outside of the tube, the said tongue being adapted to engage a dovetailed groove $C'$, formed on the inner face of a protector C, preferably made of metal and approximately U shape in cross-section, so as to extend with its thinned side edges onto the sides of the tube A a distance from the sides of the rim B to permit proper flexing of the tube A.

On the outside of the protector C is formed an integral tongue $C^2$, engaging a dovetailed groove $D'$, formed on the inner face of a tread D, fitting a portion of the protector C immediately adjacent the sides of the tongue $C^2$. By the arrangement described the tube A is protected at its running portion as well as on the sides to prevent the tube from being punctured, and in order to give the desired resiliency the protector C does not come in contact with the ground, but is provided with the elastic tread D.

In the modified form shown in Fig. 2 the dovetailed groove $C'$ on the inner face of the protector C is formed by lugs $C^3$, and the said protector, instead of having the tongue $C^2$, is provided on its outside with diverging projections or tongues $C^4$, engaging corresponding grooves or recesses in the tread $D^2$ to hold the latter in position on the outer surface of the protector.

In either of the two cases described and shown it will be seen that the protector can be readily placed in position on the tube A, especially when the latter is deflated, and the tread D can be readily connected with the tongue $C^2$ of the protector without the use of additional fastening means.

In case any one of the parts is unduly worn, especially the tread D, it can be readily replaced.

Having thus described our invention, we claim as new and desire to secure by Letters Patent—

1. A tire, comprising a flexible tube formed with an integral tongue having undercut edges, a protector approximately U-shaped in cross-section with tapering side members fitting onto the sides of the tube, the protector being formed on its inner face at the bottom thereof with a dovetailed groove to receive the tongue of the tube and on its outer face below the groove with a tongue having undercut edges, and a tread having a dovetailed groove on its inner face to receive the tongue of the protector.

2. A tire comprising a flexible tube formed with an external integral locking-tongue, a protector, approximately U-shaped in cross-section and fitting the said tube externally, the protector being formed on its inner face with a dovetailed groove for the reception of the said locking-tongue, and a tread on the outside of the said protector and having a tongue-and-groove connection therewith.

3. A tire comprising a flexible tube formed with an external integral locking-tongue, a protector, approximately U-shaped in cross-section and fitting the said tube externally, the protector being formed on its inner face with a dovetailed groove for the reception of the said locking-tongue and also formed on its outer surface with a tongue having undercut edges, and a tread having a dovetailed groove on its inner face, engaging the said tongue on the protector, to lock the tread in position on the protector.

In testimony whereof we have signed our names to this specification in the presence of two subscribing witnesses.

GEORGE DEVOLL.
GEORGE H. RISLEY.

Witnesses:
F. C. BEACH,
EVERARD BOLTON MARSHALL.